United States Patent
Mancuso et al.

(10) Patent No.: US 9,684,311 B2
(45) Date of Patent: Jun. 20, 2017

(54) SYSTEM AND METHOD FOR CONTROL AND OPTIMIZATION OF PCP PUMPED WELL

(71) Applicants: Bernardo Martin Mancuso, Houston, TX (US); Kelly Alexander Woolsey, Canmore (CA)

(72) Inventors: Bernardo Martin Mancuso, Houston, TX (US); Kelly Alexander Woolsey, Canmore (CA)

(*) Notice: Subject to any disclaimer, the term of this patent is extended or adjusted under 35 U.S.C. 154(b) by 362 days.

(21) Appl. No.: 14/325,783

(22) Filed: Jul. 8, 2014

(65) Prior Publication Data

US 2016/0011602 A1    Jan. 14, 2016

(51) Int. Cl.
*G05D 7/06* (2006.01)
*G05B 15/02* (2006.01)
*G05D 9/12* (2006.01)

(52) U.S. Cl.
CPC .......... *G05D 7/0676* (2013.01); *G05B 15/02* (2013.01); *G05D 9/12* (2013.01)

(58) Field of Classification Search
None
See application file for complete search history.

(56) References Cited

U.S. PATENT DOCUMENTS

| | | | |
|---|---|---|---|
| 3,091,179 A * | 5/1963 | Echols | E21B 47/0008 417/12 |
| 4,455,870 A | 6/1984 | Jorritsma | |
| 5,063,775 A | 11/1991 | Walker, Sr. et al. | |
| 5,313,842 A | 5/1994 | Marsh et al. | |
| 5,782,608 A | 7/1998 | McKee | |
| 6,041,856 A | 3/2000 | Thrasher et al. | |
| 6,246,331 B1 | 6/2001 | McHugh et al. | |
| 8,281,853 B1 | 10/2012 | Hill et al. | |
| 8,297,353 B2 | 10/2012 | Roddy et al. | |
| 8,892,372 B2 * | 11/2014 | Peterson | G01F 25/0061 417/36 |
| 2004/0062658 A1 * | 4/2004 | Beck | E21B 43/126 417/42 |
| 2012/0150518 A1 | 6/2012 | Guyaguler et al. | |
| 2012/0152533 A1 | 6/2012 | Hoefel et al. | |
| 2012/0325456 A1 | 12/2012 | Hill | |
| 2013/0071262 A1 | 3/2013 | Green | |
| 2013/0192841 A1 * | 8/2013 | Feasey | E21B 21/08 166/336 |
| 2013/0277063 A1 | 10/2013 | Palka | |

OTHER PUBLICATIONS

Notification of Transmittal of the International Search Report and the Written Opinion of the International Searching Authority from corresponding PCT/US2015/039471 dated Oct. 6, 2015.

(Continued)

*Primary Examiner* — Sean Shechtman
(74) *Attorney, Agent, or Firm* — Lando & Anastasi, LLP

(57) ABSTRACT

A method of controlling the production efficiency of a well includes determining one or more parameters of a pump model for a pump of the well, determining an inflow rate of liquid into the well, and adjusting a pumping speed of the pump based on the one or more parameters of the pump model to maintain a outflow rate of liquid from the well at a desired fraction of the inflow rate.

18 Claims, 7 Drawing Sheets

(56) References Cited

OTHER PUBLICATIONS

Zhou, Desheng et al.: "Design of Progressive Cavity Pump Wells" (Presentation), Society of Petroleum Engineers; SPE Progressing Cavity Pumps Conference; Publication [online], 2008 [retrieved Sep. 13, 2015]; Retrieved from the Internet: <URL: http://alrdc.com;workshops/2008_Spring2008PCP/presentations/01%20---%20New%20Technologies/113324.pdf>; pp. 1-28.
Zhou, Desheng: "Design of Progressive Cavity Pump Wells", SPE 113324 (2008).

* cited by examiner

SYSTEM AND METHOD FOR CONTROL AND OPTIMIZATION OF PCP PUMPED WELL

BACKGROUND

1. Field of Invention

Aspects and embodiments of the present disclosure are directed to systems and methods for monitoring and optimizing operating parameters of oil and water well pumps, with specific reference to progressive cavity pumps.

2. Discussion of Related Art

Progressive cavity pumps (PCP) are artificial lift systems utilized in various instances requiring the pumping of a fluid, for example, in the oil production industry for pumping oil from an oil well. A PCP often includes a metallic helictical rotor that spins within a rubber (elastomeric) stator. The stator flexes to conform to portions of the rotor and produce a seal between the rotor and different lobes of the stator. Cavities are formed between the rotor and stator that progress through the extension of the pump as the rotor spins, thus creating the pumping effect.

A PCP is used to produce liquids from wells by installing it down hole and linking the rotor to a rod string shaft and a drive head that will produce the rotational movement. A PCP can also be linked to a down hole motor, hydraulic drive, or any other type of prime mover.

SUMMARY

In accordance with an aspect of the present disclosure, there is provided a method for controlling the production efficiency of a well. The method comprises determining one or more parameters of a pump model for a pump of the well, determining a well inflow rate of liquid into the well, and adjusting a pumping speed of the pump based on the one or more parameters of the pump model to maintain a well outflow rate of liquid from the well at a predetermined fraction of the well inflow rate. The predetermined fraction may be substantially equal to the well inflow rate.

In some embodiments, the one or more parameters of the pump model include one of slippage and cavity fillage.

In some embodiments, the cavity fillage is determined by a method including measuring a first well outflow rate while running the pump at a first speed, measuring a second well outflow rate while running the pump at a second speed, and calculating the cavity fillage from a comparison between the first well outflow rate and the second well outflow rate, a comparison between the first speed and the second speed, and a displacement of the pump.

In some embodiments, the method further comprises calculating the slippage from the first well outflow rate, the first speed, the cavity fillage, and the displacement of the pump.

In some embodiments, the well inflow rate is re-evaluated on a periodic basis, the well inflow rate determined using a method including pumping a level of liquid in the well down to an intake level of the pump, measuring a well outflow rate of the liquid from the well while operating the pump with the level of liquid in the well at the intake level of the pump, and setting the re-evaluated well inflow rate at the measured well outflow rate.

In some embodiments, the method further comprises increasing the efficiency of the well by adjusting the pumping speed of the pump based on the re-evaluated well inflow rate, the slippage, and the displacement of the pump.

In some embodiments, the method further comprises continuously monitoring the pumping speed of the pump and the well outflow rate and, responsive to the well outflow rate being more than a predetermined amount more than an expected well outflow rate, performing a re-calculation of slippage of the pump.

In some embodiments, the method further comprises adjusting the pump speed based on the re-calculation of the slippage of the pump responsive to the well outflow rate being more than the predetermined amount more than the expected well outflow rate.

In some embodiments, the method further comprises continuously monitoring the pumping speed of the pump and the well outflow rate and, responsive to the well outflow rate being less than a predetermined amount less than an expected well outflow rate, adjusting the pumping speed.

In accordance with another aspect, there is provided a system for pumping liquid from a well. The system comprises a liquid pump disposed in a bore of the well, a flow meter configured to measure a well outflow rate of liquid from the well, and a controller in communication with the liquid pump and the flow meter. The controller is configured to determine one or more parameters of a pump model for the liquid pump, determine an well inflow rate of liquid into a bore of the well, and adjust a pumping speed of the liquid pump based on the one or more parameters of the pump model to maintain the well outflow rate at a predetermined fraction of the well inflow rate. The predetermined fraction may be substantially equal to the well inflow rate.

In some embodiments, the one or more parameters of the pump model include one of slippage and cavity fillage.

In some embodiments, the controller is configured to determine cavity fillage by a method including receiving an indication of a first well outflow from the flow meter while running the liquid pump at a first speed, receiving an indication of a second well outflow rate from the flow meter while running the liquid pump at a second speed, and calculating the cavity fillage from a comparison between the first well outflow rate and the second well outflow rate, a comparison between the first speed and the second speed, and a displacement of the fluid pump.

In some embodiments, the controller is further configured to calculate the slippage from the first well outflow rate, the first speed, the cavity fillage, and the displacement of the pump.

In some embodiments, the controller is further configured re-evaluate the well inflow rate on a periodic basis, the well inflow rate determined by the controller using a method including pumping a level of fluid in the well down to an intake level of the liquid pump, receiving an indication of a well outflow rate of the fluid from the well from the flow meter while operating the liquid pump with the level of fluid in the well at the intake level of the liquid pump, and setting the re-evaluated well inflow rate at the well outflow rate.

In some embodiments, the controller is further configured to continuously monitor the pumping speed of the pump and the well outflow rate and, responsive to the well outflow rate being more than a predetermined amount more than an expected well outflow rate, to perform a re-calculation of slippage of the liquid pump.

In some embodiments, the controller is further configured to adjust the pumping speed based on the re-calculation of the slippage of the liquid pump responsive to the well outflow rate being more than the predetermined amount more than the expected well outflow rate.

In some embodiments, the controller is further configured to continuously monitor the pumping speed of the liquid pump and the well outflow rate and, responsive to the well outflow rate being less than a predetermined amount less than an expected well outflow rate, adjust the pumping speed.

In some embodiments, the controller is further configured to store information pertaining to the well inflow rate, slippage, cavity fillage, well outflow rate, and other values of parameters associated with the well system.

In some embodiments, the controller is further configured to represent a graphical representation of the information in a human-machine interface.

In some embodiments, the controller is further configured to track pump slippage and cause an alarm if high pump slippage is detected.

In accordance with another aspect, there is provided a non-volatile computer readable medium having computer executable instructions encoded thereon which, when executed on a controller of a system for pumping liquid from a well cause the controller to perform a method including determining one or more parameters of a pump model for a pump of the well, determining a well inflow rate of liquid into the well, and adjusting a pumping speed of the pump based on the one or more parameters of the pump model to maintain a well outflow rate of liquid from the well at a predetermined fraction of the well inflow rate.

In some embodiments, the instructions further cause the controller to determine a cavity fillage of the pump by a method including measuring a first well inflow rate while running the pump at a first speed, measuring a second well inflow rate while running the pump at a second speed, and calculating the cavity fillage from a comparison between the first well inflow rate and the second well inflow rate, a comparison between the first speed and the second speed, and a displacement of the pump.

In some embodiments, the instructions further cause the controller to periodically re-evaluate the well inflow rate using a method including pumping a level of fluid in the well down to an intake level of the pump, measuring a well outflow rate of the fluid from the well while operating the pump with the level of fluid in the well at the intake level of the pump, and setting the re-evaluated well inflow rate at the measured well outflow rate.

In accordance with another aspect, there is provided a method for determining a well inflow of liquid into a well bore of a well. The method comprises pumping a level of liquid in the well down to an intake level of a pump in the well bore, measuring a well outflow of the fluid from the well while operating the pump with the level of liquid in the well at the intake level of the pump, and setting the well inflow at the measured well outflow.

In some embodiments, the method further comprises determining a maximum well inflow by re-measuring the well outflow of the fluid from the well a plurality of times while operating the pump with the level of liquid in the well at the intake level of the pump until a final measured well outflow differs from a previously measured well outflow by less than a predetermined amount, and setting the maximum well inflow at the final measured well outflow.

In some embodiments, the method is performed on a substantially regularly timed basis.

In some embodiments, the method is performed responsive to a drop in a measured outflow of the well.

In some embodiments, the method further comprises determining a well inflow performance relationship from measurements of the well outflow and level of liquid in the well at multiple different values of well outflow.

In some embodiments, the method further comprises determining a static reservoir pressure of a reservoir associated with the well from the measurements the well inflow and level of liquid in the well at multiple different values of well outflow.

In some embodiments, the method further comprises estimating a dynamic liquid level of the well from measurements of the well inflow, well outflow, and inflow performance relationship at a plurality of different times.

In accordance with another aspect, there is provided a system for pumping liquid from a well. The system comprises a liquid pump disposed in a bore of the well, a flow meter configured to measure a well outflow of liquid from the well, and a controller in communication with the liquid pump and the flow meter and configured to determine a well inflow of liquid into a well bore of the well by pumping a level of liquid in the well down to an intake level of the liquid pump, measuring a well outflow of the fluid from the well while operating the pump with the level of liquid in the well at the intake level of the pump, and setting the well inflow at the measured well outflow.

In some embodiments, the controller is further configured to determine a maximum well inflow by re-measuring the well outflow of the fluid from the well a plurality of times while operating the pump with the level of liquid in the well at the intake level of the pump until a final measured well outflow differs from a previously measured well outflow by less than a predetermined amount, and setting the maximum well inflow at the final measured well outflow.

In some embodiments, the controller is further configured to adjust a speed of the liquid pump responsive to the measured well outflow.

In some embodiments, the controller is further configured to determine a well inflow performance relationship from measurements of the well outflow and level of liquid in the well at multiple different values of well outflow.

In some embodiments, the controller is further configured to determine a static reservoir pressure of a reservoir associated with the well from the measurements of the well inflow and level of liquid in the well at multiple different values of well outflow.

In some embodiments, the controller is further configured to estimate a dynamic liquid level of the well from measurements of the well inflow, well outflow, and inflow performance relationship at a plurality of different times.

In accordance with another aspect, there is provided a non-volatile computer readable medium having computer executable instructions encoded thereon which, when executed on a controller of a system for pumping liquid from a well cause the controller to perform a method including determining a well inflow of liquid into a well bore of the well by pumping a level of liquid in the well down to an intake level of the liquid pump, measuring a well outflow of the fluid from the well while operating the pump with the level of liquid in the well at the intake level of the pump, and setting the well inflow at the measured well outflow.

In accordance with another aspect, there is provided a method of controlling the production efficiency of a well. The method comprises determining one or more parameters of a pump model for a liquid pump of the well by measuring well outflow of liquid from the well at a plurality of different pumping speeds of the liquid pump, and adjusting a nominal operating pumping speed of the pump based on the one or more parameters of the pump model to maintain a well outflow rate of liquid from the well at a desired level.

In some embodiments, the desired level is a predetermined fraction of an inflow rate of fluid into a well bore of the well. In some embodiments, the predetermined fraction is substantially the same as the inflow rate.

In some embodiments, the one or more parameters of the pump model include one of slippage and cavity fillage.

In some embodiments, the slippage is determined by a method including measuring a first well outflow rate while running the liquid pump at a first speed, and calculating the slippage by a comparison of a theoretical pump outflow at the first speed provided by a manufacturer of the liquid pump and the first well outflow rate.

In some embodiments, the method further comprises increasing the efficiency of the well by adjusting the pumping speed of the liquid pump based on the slippage and a displacement of the pump.

In some embodiments, the cavity fillage is determined by a method including measuring a first well outflow rate while running the liquid pump at a first speed, measuring a second well outflow rate while running the liquid pump at a second speed, and calculating the cavity fillage from a comparison between the first well outflow rate and the second well outflow rate, a comparison between the first speed and the second speed, and a displacement of the liquid pump.

In some embodiments, the method further comprises calculating the slippage from the first well outflow rate, the first speed, the cavity fillage, and the displacement of the liquid pump.

In some embodiments, the method further comprises increasing the efficiency of the well by adjusting the pumping speed of the liquid pump based on the slippage, the cavity fillage, and the displacement of the pump.

In some embodiments, the method further comprises calculating the cavity fillage from a measured well outflow rate at a set pumping speed, the slippage, and the displacement of the pump.

In some embodiments, the method further comprises continuously monitoring the pumping speed of the pump and the well outflow rate and, responsive to the well outflow rate being more than a predetermined amount more than an expected well outflow rate, performing a re-calculation of slippage of the pump.

In some embodiments, the method further comprises adjusting the pump speed based on the re-calculation of the slippage of the pump responsive to the well outflow rate being more than the predetermined amount more than the expected well outflow rate.

In some embodiments, the method further comprises continuously monitoring the pumping speed of the pump and the well outflow rate and, responsive to the well outflow rate being less than a predetermined amount less than an expected well outflow rate, adjusting the pumping speed.

In accordance with another aspect, there is provided a system for pumping liquid from a well. The system comprises a liquid pump disposed in a bore of the well, a flow meter configured to measure a well outflow rate of liquid from the well, and a controller in communication with the liquid pump and the flow meter and configured to determine one or more parameters of a pump model for the liquid pump by measuring well outflow of liquid from the well at a plurality of different pumping speeds of the liquid pump, and adjust a pumping speed of the liquid pump based on the one or more parameters of the pump model to maintain the well outflow rate substantially equal to a desired level.

In some embodiments, the one or more parameters of the pump model include one of slippage and cavity fillage.

In some embodiments, the controller is configured to determine cavity fillage by a method including receiving an indication of a first well outflow from the flow meter while running the liquid pump at a first speed, receiving an indication of a second well outflow rate from the flow meter while running the liquid pump at a second speed, and calculating the cavity fillage from a comparison between the first well outflow rate and the second well outflow rate, a comparison between the first speed and the second speed, and a displacement of the fluid pump.

In some embodiments, the controller is further configured to calculate the slippage from the first well outflow rate, the first speed, the cavity fillage, and the displacement of the pump.

In some embodiments, the controller is further configured to continuously monitor the pumping speed of the pump and the well outflow rate and, responsive to the well outflow rate being more than a predetermined amount more than an expected well outflow rate, to perform a re-calculation of slippage of the liquid pump.

In some embodiments, the controller is further configured to adjust the pumping speed based on the re-calculation of the slippage of the liquid pump responsive to the well outflow rate being more than the predetermined amount more than the expected well outflow rate.

In some embodiments, the controller is further configured to continuously monitor the pumping speed of the liquid pump and the well outflow rate and, responsive to the well outflow rate being less than a predetermined amount less than an expected well outflow rate, adjust the pumping speed.

In accordance with another aspect, there is provided a non-volatile computer readable medium having computer executable instructions encoded thereon which, when executed on a controller of a system for pumping liquid from a well cause the controller to perform a method including determining one or more parameters of a pump model for a liquid pump of the well by measuring well outflow of liquid from the well at a plurality of different pumping speeds of the liquid pump, and adjusting a pumping speed of the liquid pump based on the one or more parameters of the pump model to maintain a well outflow rate of liquid from the well at a desired level.

In some embodiments, the instructions further cause the controller to determine a cavity fillage of the pump by a method including measuring a first well inflow rate while running the liquid pump at a first speed, measuring a second well inflow rate while running the liquid pump at a second speed, and calculating the cavity fillage from a comparison between the first well inflow rate and the second well inflow rate, a comparison between the first speed and the second speed, and a displacement of the liquid pump.

In some embodiments, the instructions further cause the controller to calculate the slippage from the first well outflow rate, the first speed, the cavity fillage, and the displacement of the pump, and adjust the pumping speed based on calculation of the slippage of the liquid pump responsive to the well outflow rate being more than the predetermined amount more than the expected well outflow rate.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
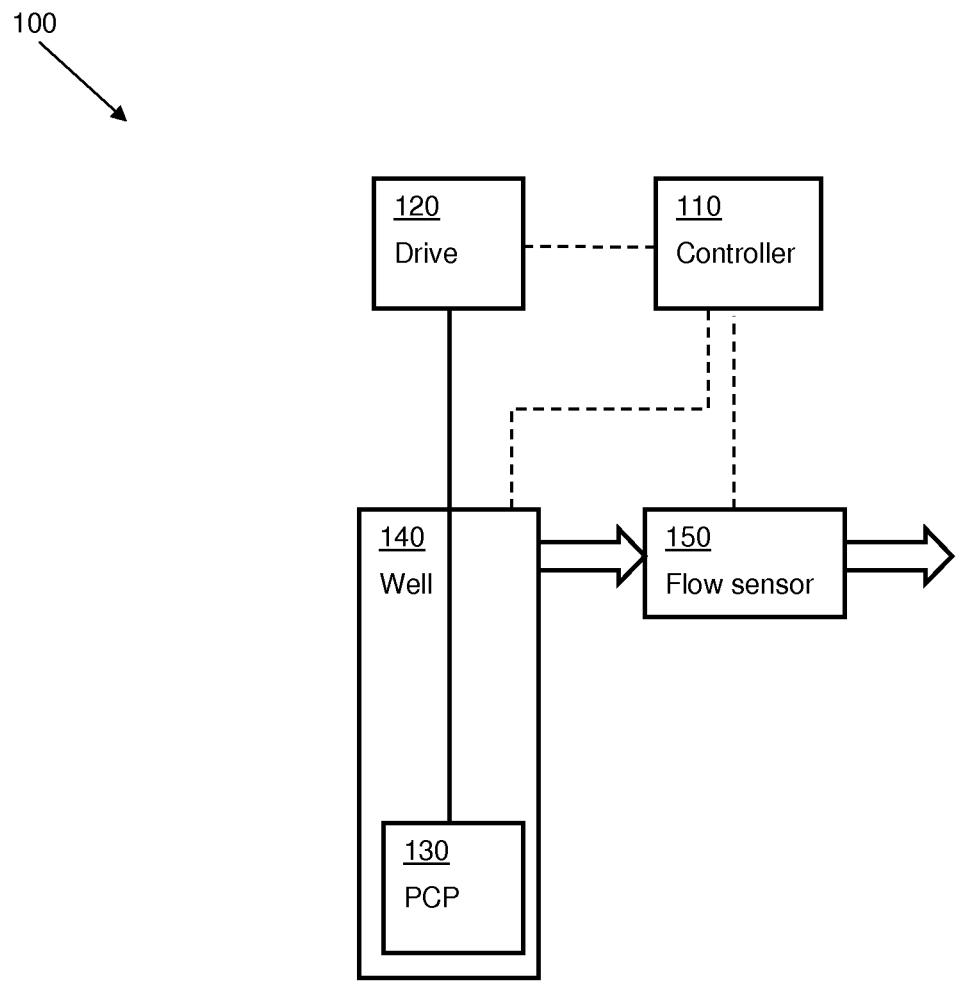
FIG. 1 is a schematic diagram of a well and pump system.

This disclosure is not limited in its application to the details of construction and the arrangement of components set forth in the following description or illustrated in the drawings. The disclosed systems and methods are capable of other embodiments and of being practiced or of being carried out in various ways. Also, the phraseology and terminology used herein is for the purpose of description and should not be regarded as limiting. The use of "including," "comprising," "having," "containing," "involving," and variations thereof herein is meant to encompass the items listed thereafter and equivalents thereof as well as additional items.

Various aspects and embodiments disclosed herein include systems and methods for monitoring and controlling various operating parameters of a fluid pump system, for example, an oil well pump system utilized to pump oil from an oil reservoir. In some embodiments, by determining the parameters of a pump model and the oil production capability of an oil reservoir (the well inflow, or rate of flow of liquid into the well bore from a reservoir), the system pumping speed may be controlled and may be automatically adjusted to provide improved and/or optimal operating conditions for a specific well. Embodiments of systems and methods disclosed herein protect the pumping system from unexpected situations such as a sudden reduction in well inflow, an obstruction in the pump intake, accumulation of sand, instrumentation misinformation, excessive pump wear, or other operational disturbances, thus preventing damage to the pump, rod string, and other components of the pumping system.

Various aspects and embodiments disclosed herein perform automatic and ongoing testing to determine oil well pumping system operating parameters including, for example, well inflow, pump slippage (an amount of fluid entering an inlet of a pump that is not expelled from the outlet of the pump), and pump cavity fillage (a proportion of the cavities of a PCP that are filled with liquid, rather than gas, while the pump is pumping) under controlled conditions without the need to halt production of the well. Information regarding these parameters is used to create an adjusted pump model based on slippage and cavity fillage. An improved and/or optimum pump operating speed is then determined and set for a predefined time period. Operating the pump at the improved and/or optimum pump operating speed increases the efficiency of operation of the oil well.

Some methods used to determine the operational condition of an oil well may rely on static testing, which requires a halt in production, often of at least 24 hours, while the testing takes place. These methods can determine static pressure, formation parameters, and potential liquid flow from the well by measuring the evolution of down hole pressure or/and annular liquid levels, but may be applied sporadically as they require well intervention.

In some methods, pump operational parameters and performance may be identified on test benches which baseline a pump on its parameters prior to the installation in the well. The operational parameters of a PCP, however, may change dramatically after installation due to swelling or wear of the elastomeric material of the stator, producing changes in fluid slippage through the pump and, therefore, changes in pump efficiency. Operating a PCP based on parameters determined prior to beginning operation of the pump in a well may result in operating the pump at conditions which are non-optimal or less efficient than may be desired.

Some methods for automatic operation of oil pumps may rely on controllers that, by means of measurements of well outflow (the rate of fluid exiting the well or liquid production of a well) and a variable speed drive, run the pump at speed step increases that cause the well to reach a pump off state (a state in which the pump is running faster than necessary to remove liquid inflowing into the well). During this process the flow will increase proportionally to the speed increase until the pump off condition is reached, which is detected by a less that proportional increase in flow per speed increase. The pump speed is then decreased until a proportional decrease in the outflow is detected, identifying that the pump off condition has ceased. This process is repeated on an ongoing basis producing a constant oscillation in pump speed and production. These methods may be sensitive to noise from the flow metering device that can lead to erratic behavior.

An alternative method is to accelerate a pump of a well to the maximum operating speed of the pump while monitoring well outflow until the pump off condition is detected by a sudden drop in well outflow. The pump speed is then reduced by steps until a proportional reduction in well outflow is detected at which point the operating speed of the pump is defined. This method leads to a high risk for the pump as operating at high speeds in a pump off condition can lead to permanent damage to the pump.

Various aspects and embodiments disclosed herein overcome various disadvantages of these methods for oil well pump control. Aspects and embodiments disclosed herein include systems and methods for controlling the speed of a PCP to increase well outflow while avoiding operation of the well in a pumped-off state. In one embodiment, illustrated schematically in FIG. 1, a pumping system, generally indicated at 100, includes a controller 110 to control a variable speed drive 120 to drive a PCP 130 at a set pump speed while measuring well 140 and system parameters indicative of pumping performance, well outflow, and well inflow. The controller 110 may also, in some embodiments, gather different well head parameters including well head pressure, line pressure, line temperature, etc. from the well head that can be used for control or protection of the pumping system 100.

In some embodiments, well outflow is measured using a flow sensor 150, which may be any flow sensor for measuring the flow of fluid that is known in the art. The controller 110 determines a model of the pumping system and the well inflow from the well and system parameters. The controller 110, acting through the variable speed drive 120, in response to the measured well and system parameters, then sets the speed of the pump 130 to match the well outflow with the well inflow, or with a desired fraction of the well inflow. Further, the controller 110, responsive to the measured well and system parameters, periodically re-evaluates the well inflow to determine a new pump speed matching the well inflow or fraction thereof while avoiding pump and well operation in a pumped-off state.

In some embodiments, a control method performed by the controller 110 may include starting the well pump 130 at a low, constant speed (a speed which does not lead to a pump off condition) and monitoring the well outflow until stable operating conditions, for example, the production tubing being full of liquid and a liquid level in the well bore being stable, are observed. Stabilization of the operating conditions may, in some embodiments, take between about 15 minutes and about four hours. Once stable operating conditions are achieved, the controller 110 will, on a periodic basis, perform one or more operations including, for example, performing a measurement of slippage of the pump 130, perform a measurement of cavity fillage of the pump 130, adjust pump model parameters based on one or both of the slippage and cavity fillage measurements, measure well inflow, and calculate pump speed required to match well outflow with a measured well inflow or fraction thereof.

In some embodiments, a plurality of measurements of well inflow may be taken at different times. The plurality of measurements of well inflow may be used to calculate various parameters of the well, for example, a maximum well inflow value, an inflow performance relationship (IPR, a relationship between well inflow and bottomhole flowing pressure or reservoir pressure), dynamic liquid level of the well, static reservoir pressure of a reservoir associated with the well, and a remaining capacity of the reservoir associated with the well. For example, the inflow performance relationship can be determined by the maximum inflow and liquid level values at a different production rates, dynamic liquid level of the well may be determined by the IPR or from a static condition measured by measuring the time and well outflow required to bring fluid to the surface of the well, or, alternatively, to reach a pump off condition at different times. The static reservoir pressure may be determined from the inflow performance relationship. The remaining capacity of the reservoir may be determined from a change in the static reservoir pressure over time.

In some embodiments, the controller 110 will, on a continuous basis, perform one or more operations including, for example, monitoring the well outflow to verify that the well outflow remains within a defined dead band from a calculated flow value obtained from the adjusted model and for a constant speed of the pump, re-measuring slippage and adjusting the pump model and the speed of the pump 130 if the well outflow rises above an upper limit of the dead band (which may occur due to swelling of the pump stator), and adjusting the speed of the pump 130 to match a new flow value if the well outflow drops below a lower limit of the dead band (which may occur if inflow was reduced or some kind of obstruction occurred to the well or pump).

In some embodiments, the controller 110 will determine slippage by obtaining a well outflow and pump speed measurement and comparing these values with the expected well outflow at zero head for that pump (a condition in which the slippage is zero). In some embodiments, slippage (Sl) is determined using the following equation:

$$Sl = Qm - Dp*Vm$$

Where Qm is measured well outflow, Vm is measured pump speed, and Dp is pump displacement or pump capacity. Dp is a constant for a particular pump.

Further, the controller 110 may determine slippage and cavity fillage (Cf) by obtaining well outflow and pump speed measurements at two different pump speeds (Q1 and V1, and Q2 and V2, respectively) and calculating cavity fillage and slippage as follows:

$$C_f = \frac{(Q_2 - Q_1)}{D_p \cdot (V_2 - V_1)}$$

$$Sl = -Q_2 + D_p C_f V_2 = -Q_1 + D_p C_f V_1$$

Further, assuming no change in the pump slippage in a time interval, the cavity fillage can be calculated as a function of pump speed (V) as follows:

$$C_f = \frac{(Q_m + Sl)}{D_p V}$$

The adjusted pump model is now calculated as:

$$Qc = Dp*Cf*V - Sl$$

Where Qc is the new calculated outflow rate.

In some embodiments, to determine well inflow, the controller 110 will increase the pump speed with a constant slow acceleration. The speed of the pump should be increased at a rate which is slow enough to let the well and the reservoir react to the change in pump speed and exhibit characteristics, for example, liquid level and/or well inflow (or variations thereof) that are similar to what would be observed when operating at a constant pump speed. The speed ramp can achieve speed values as high as the maximum operating speed of the pump and may be performed over a time period of from about 30 minutes to about 12 hours. An increase in well outflow is expected as a result of increasing the speed of the pump. The pump speed may be increased to a speed sufficient to achieve an over pumped condition wherein the liquid in the well is pumped down to the pump intake level, a condition known as pump off. Providing that the speed of the pump is increased slowly enough during the speed ramp, the pump cavity fillage may remain high enough to avoid any kind of pump damage.

While the pump speed ramp evolves, the over pumping condition occurs. As the slope of the ramp evolves, the well liquid level approximates the pump off level. The pump off level can be identified by comparing the modeled well outflow with the measured well outflow. A mismatch between the modeled well outflow and the measured well outflow provides an identification of the pump off condition being reached. Also, the condition can be detected by calculating the cavity fillage. A drop in cavity fillage value provides an identification of the pump off condition. At pump off, the well outflow that can be obtained from the well will match the well inflow.

The well inflow will increase in a short span of time with a decrease in down hole pressure with a logarithmic behavior for a specific well bore pressure, making the well inflow asymptotically approach the maximum well inflow for that pressure condition over time. For this reason, it may be desirable to repeat the well inflow measurement several times to accurately determine the maximum well inflow value for a well.

Knowing the well inflow (Qi) and the pump model, a new operating speed V for the pump 130 can be calculated as:

$$V = (Qi + Sl)/Dp$$

Or $$V = (Qi + Sl)/(Dp*Cf)$$

Cf is normally about one, but this may vary on wells with high amounts of associated gas and/or low values of down hole pressure.

On a continuous basis, the controller will monitor pump speed and well outflow. The controller will maintain the well outflow within a defined dead band from the calculated well outflow expected based on the speed of the pump. If the well outflow is above this dead band then slippage will be recalculated and the pump speed adjusted accordingly. If the well outflow is below the dead band the pump speed will be adjusted to match the current well outflow.

In case of noise in the flow signal that can be produced by gas separation at the flow meter, back pressure valves, solids, vibrations at the flow meter, pump slip stick, etc., a low pass filter may be applied to the flow signal and the filtered flow signal may be used for control proposes.

Figure 2:
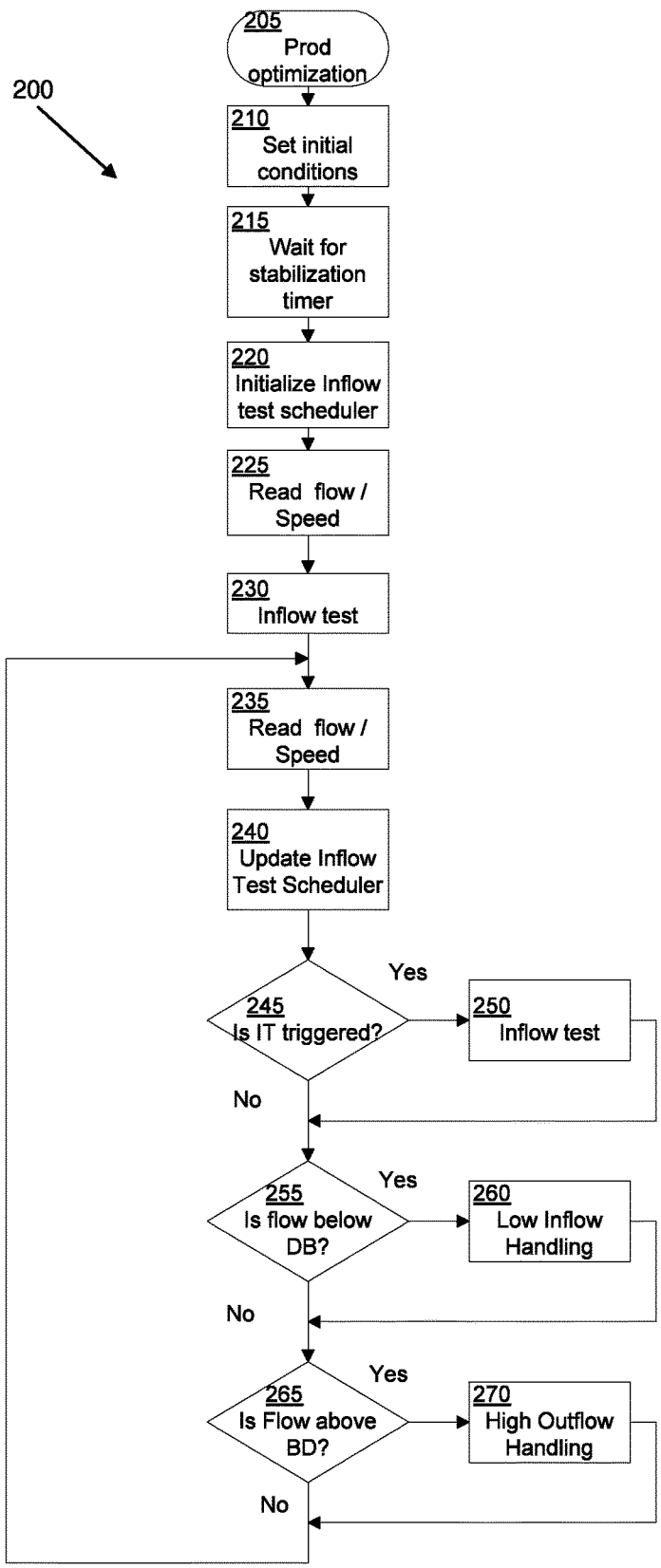
FIG. 2 is a flow chart of a method of controlling a pump for a well.

A generalized method for performing well production optimization is shown in the flowchart of FIG. 2. The method, generally indicated at 200, beings with act 205 where the well controller 110 is set to "production optimization" mode. In act 210, initial conditions, for example, an initial pump speed (a speed which does not lead to a pump off condition) are set. The pump speed is changed to the initial pump speed if the pump is not already operating at the initial pump speed and the well is run for a period of time, controlled by a well stabilization timer (act 215) to allow well parameters, for example, the well outflow and/or a fluid level in the well bore to stabilize. The well stabilization timer is in some embodiments included in the controller 110. Additionally or alternatively, the well outflow may be monitored and the stabilization period terminated when a change in well outflow over time drops below a predetermined level. In other embodiments, the stabilization period may be terminated when the liquid level in the bore of the well achieves a constant level. In some embodiments, stabilization may take between about 15 minutes and about four hours.

After stabilization, an inflow test scheduler is initialized (act 220). The inflow test scheduler may be set to trigger an inflow test on a periodic basis, for example about once every four hours to seven days. In some embodiments, the scheduler additionally or alternatively determines when pump parameters, for example, slippage and/or cavity fillage are re-calculated. The pump speed is checked and the average well outflow at the initial pump speed (Qi) is measured and recorded (act 225), for example, in a memory of the controller 110. Due to noise that may be present in a signal of well outflow, a signal from a well outflow meter may be processed through a low pass filter, or alternatively, a moving average of the outflow signal or other method of signal smoothing may be utilized when measuring the well outflow.

Figure 3:
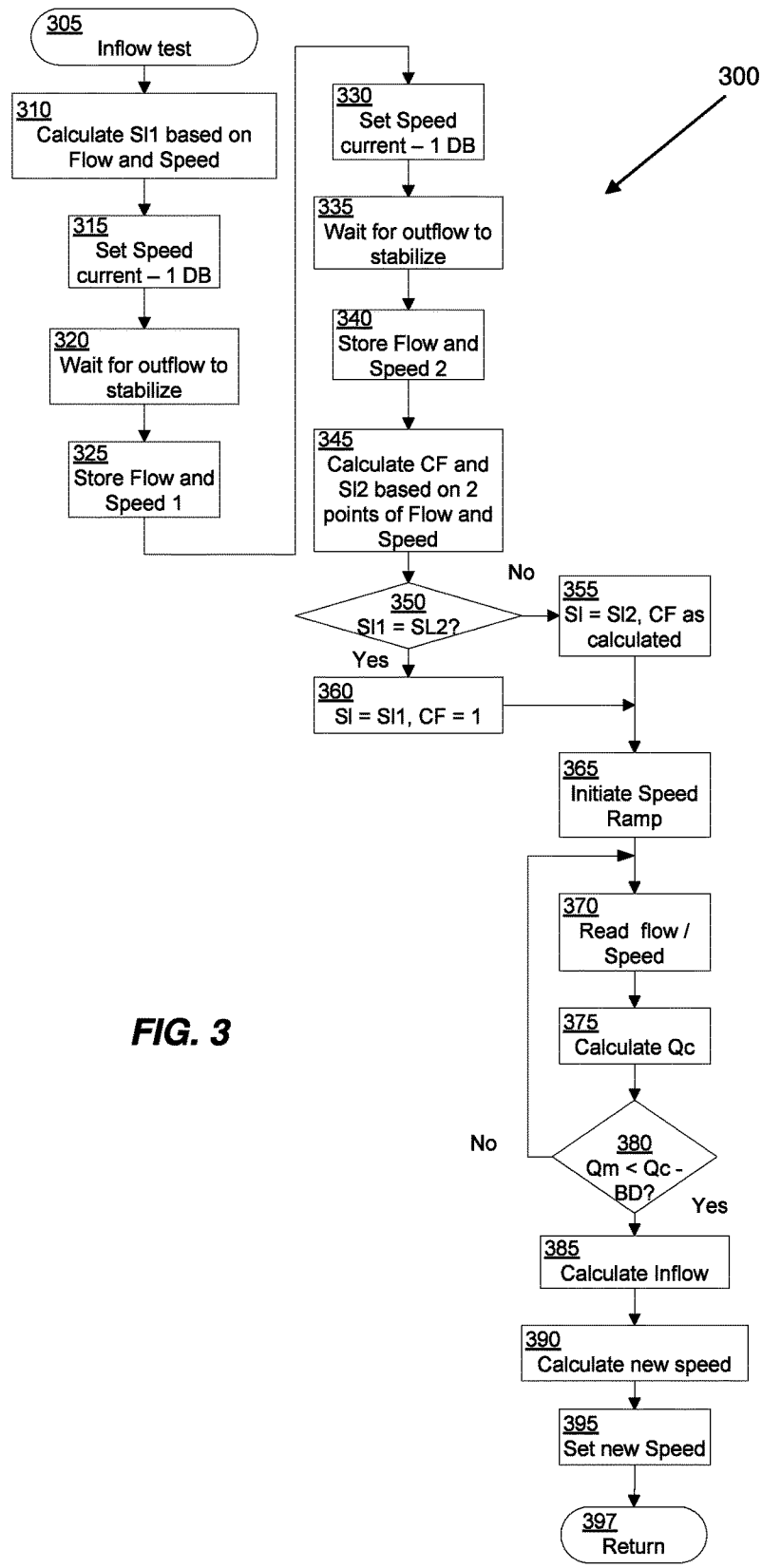
FIG. 3 is a flow chart of a portion of the method of FIG. 2.

In act 230, an inflow test is performed. An embodiment of a method of performing an inflow test is illustrated in FIG. 3, indicated generally at 300. Referring to FIG. 3, in one embodiment, in act 305, the inflow test begins. In act 310, the average well outflow (Qi) measured in act 225 of the method 200 and the initial pump speed (pump RPM or Vinitial) set in act 210 are obtained, for example, from a memory of the controller 110. A first measurement of slippage of the PCP (Sl1) is calculated in act 310 according to the equations:

$$Qzerohead = Dp * Vinitial$$

$$Sl1 = Qzerohead - Qi$$

Where Qzerohead is the expected well outflow under conditions of no fluid head above the PCP.

In act 315, the speed of the pump is set to a first reduced speed ($Vr_1$) for the inflow test. $Vr_1$ may be achieved by reducing the pump speed Vinitial by a predetermined amount that will make the calculated flow Qc match the lower deadband (DB) of the outflow. The well is run for a period of time (act 320) to allow well parameters, for example, the outflow from the well to stabilize. The period of time for which the well runs to allow for stabilization to occur may be controlled by the well outflow stabilization timer. Additionally or alternatively, the outflow from the well may be monitored and the stabilization period terminated when a change in outflow over time drops below a predetermined level. Stabilization may, in some embodiments, take between about 30 seconds and about 10 minutes. After stabilization, a first well outflow ($Qc_1$) at the first reduced pump speed for the inflow test is measured or calculated and $Qc_1$ and $Vr_1$ are stored, for example, in a memory of the controller 110. $Qc_1$ may be calculated from the equation:

$$Qc_1 = Dp * Vr_1 - Sl1$$

In act 330, the pump speed is again reduced by a predetermined amount, which may be the same or different as the predetermined amount DB by which the pump speed is reduced in act 315, to achieve a second reduced pump speed $Vr_2$. The well is run for a period of time (act 335) to allow well parameters, for example, the outflow from the well to stabilize. The period of time for which the well runs to allow for stabilization to occur may be controlled by the well outflow stabilization timer. Additionally or alternatively, the outflow from the well may be monitored and the stabilization period terminated when a change in outflow over time drops below a predetermined level. In other embodiments, the stabilization period may be terminated when the liquid level in the bore of the well achieves a constant level. Stabilization may, in some embodiments, take between about 30 seconds and about 10 minutes. After stabilization, the well outflow $Qc_2$ at the second reduced pump speed is measured or calculated and $Qc_2$ and $Vr_2$ are stored, for example, in a memory of the controller 110.

In act 345, calculations are performed to determine Cf and a second slippage (Sl2) from $Vr_1$, $Vr_2$, $Qc_1$, and $Qc_2$ in accordance with the following equations:

$$Cf = (Qc_1 - Qc_2)/(Dp*(Vr_1 - Vr_2))$$

$$Sl2 = -Qc_1 + Dp*Cf*Vr_1 = -Qc_2 + Dp*Cf*Vr_2$$

In act 350, Sl1 is compared to Sl2. If the calculated values of Sl1 and Sl2 are about equal, for example, within about 5% of each other, the slippage of the pump Sl is set at the value of Sl1 (or Sl2) and Cf of the pump is set at 1 in act 360. If the calculated values of Sl1 and Sl2 are not equal, in act 355 the slippage of the pump Sl is set at the value of Sl2 and Cf of the pump is set at the value calculated in act 345. The set values of Sl and Cf for the pump may be stored, for example, in a memory of the controller 110.

In act 365 the speed of the pump is increased to perform a speed ramp. In some embodiments, the speed ramp is performed by continuously increasing the speed of the pump, and in other embodiments, the speed of the pump is increased in steps. The speed of the pump may be increased at a rate which is slow enough to let the well and the reservoir react to the change in pump speed and exhibit characteristics, for example, liquid level and/or well inflow (or variations thereof) that are similar to what would be observed when operating at a constant pump speed. The speed ramp can achieve speed values as high as the maximum operating speed of the pump and may be performed over a time period of from about 30 minutes to about 12 hours. The speed ramp may result in the pump ramping up to a speed as high as about two times its nominal operating speed. As the pump speed is increased the pump speed (V(t)) and well outflow Qm are measured at intervals of time (act 370) corresponding to a 5% change in speed of the pump or less. Modeled well outflow (Qc(t)) at the corresponding intervals of time is calculated (act 375) according to the equation:

$$Qc(t)=Dp*V(t)-Sl$$

The pump speed ramp continues until the measured well outflow Qm(t) is smaller than (Qc−BD) (decision act 380), where BD is a predetermined amount of flow below the calculated flow. When it is determined that Qm(t) is smaller than (Qc−BD) the new well inflow (Qf) is measured and the new target pump speed (Vnew) is calculated (acts 385, 390) by solving the following equation:

$$Vnew=(Qf*SM+Sl)/Dp$$

Where SM is a user defined margin, which is in some embodiments between about 0.8 and about 1, although in other embodiments may be between about 0.01 and about 1.

Once the new target pump speed is calculated, the new target pump speed is set (act 395), the inflow test method 300 is completed, and the controller 110 returns (act 397) to performing the method 200 at act 250.

Referring back to FIG. 2, after the inflow test is performed, the well outflow and pump speed are re-measured (act 235) and recorded, for example, in a memory of the controller 110. The inflow test scheduler is updated in act 240 to decrement the remaining time before a next inflow test is performed.

In act 245, it is determined whether the scheduler has triggered an inflow test (IT). If no inflow test has been triggered, the method continues to act 255. If an inflow test has been triggered, the method proceeds to act 250 in which an inflow test is performed.

In act 255, the well outflow is measured and compared to the lower limit of the dead band for the pump speed (DB). In some embodiments, the well outflow may have decreased due to, for example, a decrease in well inflow and/or wear of the pump and/or an increase in gas levels in the well causing a greater amount of pump slippage and/or a lower cavity fillage. If the well outflow is determined to be above DB, the method 200 proceeds to act 265. If the well outflow is determined to be below DB, the method 200 proceeds to act 260, where a low inflow handling method is performed. An embodiment of a low inflow handling method 400 is shown in the flowchart of FIG. 4.

Figure 4:
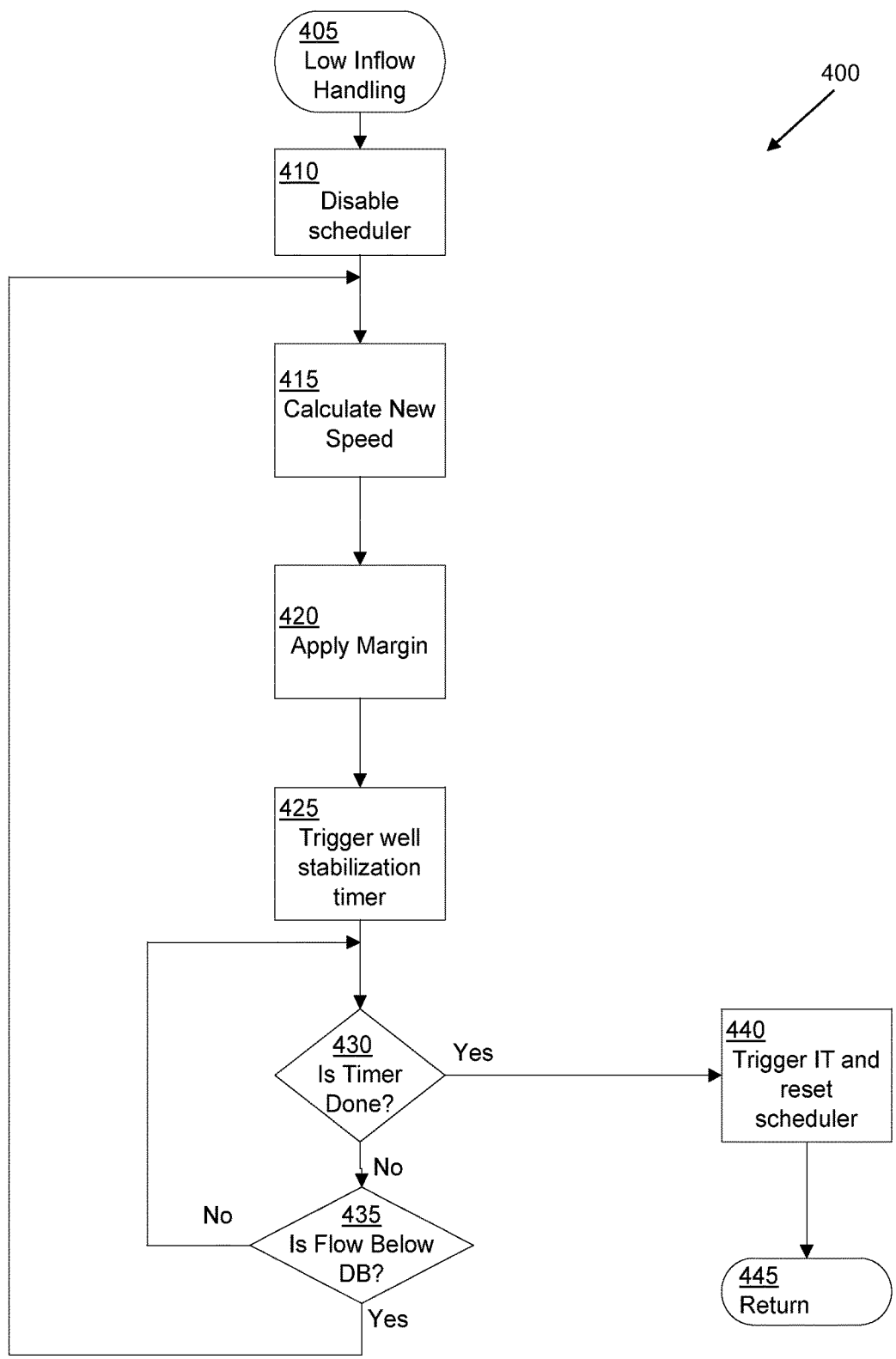
FIG. 4 is a flow chart of a portion of the method of FIG. 2.

Referring to FIG. 4, in one embodiment, the low inflow handling method generally indicated at 400 is initiated at act 405. In act 410, the inflow test scheduler is disabled so that an inflow test is not triggered until the low inflow handling method comes to completion. In act 415 a new pump speed Vn is calculated from the well outflow (Q) and the slippage of the pump (Sl) according to the formula:

$$Vn=(Q-Sl)/Dp$$

In act 420, the new pump speed Vn is modified by applying the user defined margin SM to the pump speed to obtain a new pump speed set point (Vsp) according to the formula:

$$Vsp=Vn*SM$$

The pump speed is set at the new pump speed set point Vsp and in act 425 the well stabilization timer is triggered. The well stabilization timer is, in some embodiments, set at between about 30 seconds and about ten minutes. In acts 430 and 435 if the well outflow remains above DB and the timer continues to run, the method waits for the timer to complete and then proceeds to trigger an inflow test and reset the scheduler (act 440) and to then return (act 445) to act 265 of the method 200. If, however, the well outflow falls below DB while the timer continues to run, the method 400 returns to act 415 to calculate a new pump speed and apply the margin to the new pump speed. In some embodiments, instead of, or in addition to using a stabilization timer in acts 430 and 435, well outflow may be monitored, and stabilization may be considered to be completed when the change in the well outflow over time falls below a predefined limit.

Returning to method 200 shown in FIG. 2, in act 265 the well outflow is measured and it is determined if the well outflow is above an upper limit of the well outflow dead band (BD). The well outflow may, in some embodiments, have increased if the stator of the pump swelled, thus reducing an amount of slippage of the pump or if the well inflow increased. If the well outflow is below BD, the method returns to act 235 and continues to perform inflow tests on a periodic basis and to monitor and adjust the pump speed and/or well outflow as needed. If the well outflow is above BD, the method 200 proceeds to act 270, where a high outflow handling method is performed. An embodiment of a high outflow handling method 500 is shown in the flowchart of FIG. 5.

Figure 5:
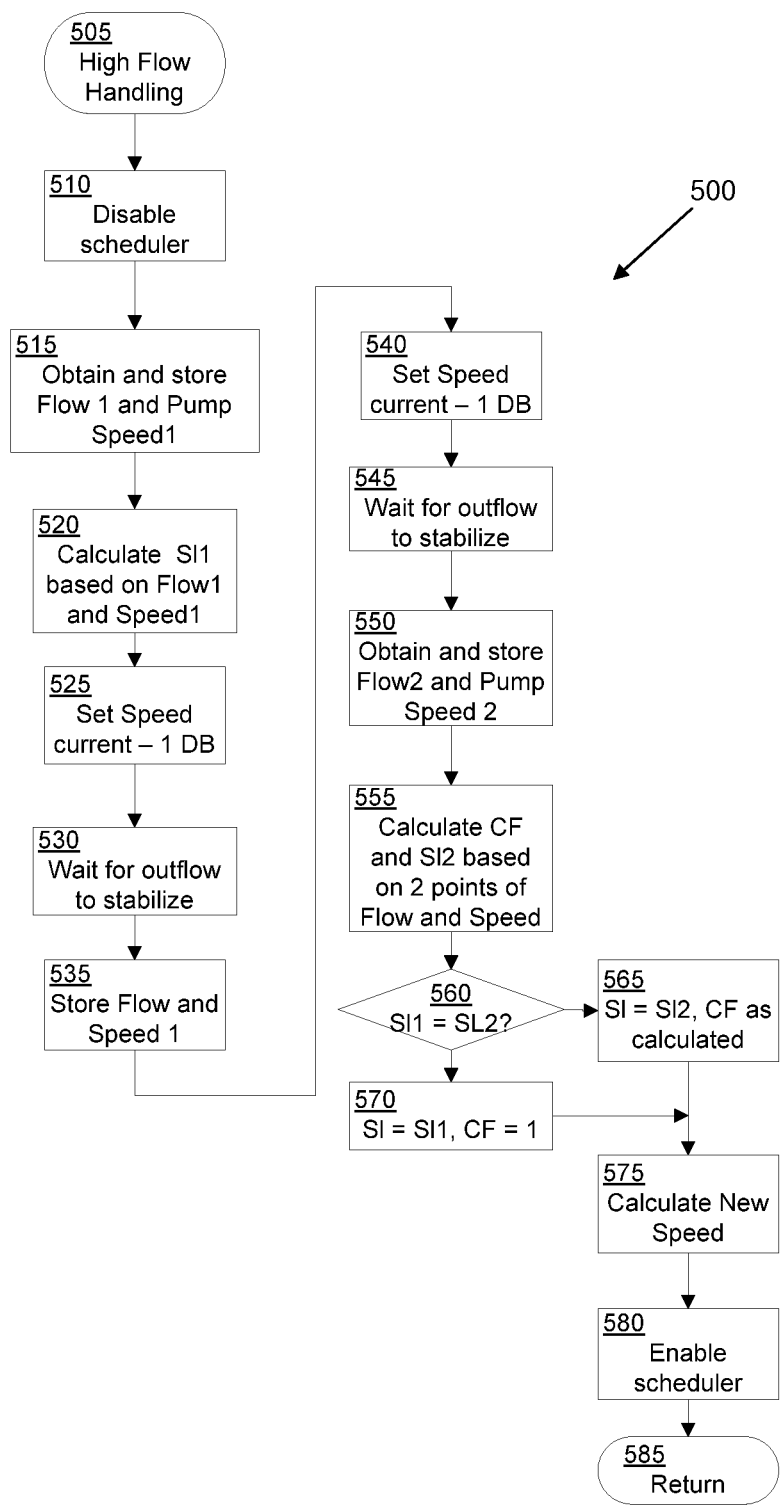
FIG. 5 is a flow chart of a portion of the method of FIG. 2.

Referring to FIG. 5, in one embodiment of the high outflow handling method, generally indicated at 500, the method is initiated at act 505. In act 510, the inflow test scheduler is disabled so that an inflow test is not triggered until the high outflow handling method 500 comes to completion. In act 515 a first well outflow (Qi) and a first speed of the pump ($V_1$) are measured and stored, for example, in a memory of the controller 110. In act 520, a first slippage Sl1 of the pump is calculated in accordance with the formulas:

$$Qzerohead=Dp*v_1$$

$$Sl1=Qzerohead-Q_1$$

In acts 525-570, the Cf and slippage of the pump are calculated in a manner similar to that described above with regard to acts 315-360 of the inflow test method 300. After the Cf and slippage of the pump are set, in act 575, a new speed of the pump Vc may be calculated in accordance with the formula:

$$Vc=(Q-Sl)/(Dp*Cf)$$

The inflow test scheduler is re-enabled in act 580 and the method ends and returns to act 240 of method 200 in act 585.

In some embodiments, the controller 110 will store the well inflow, slippage, cavity fillage, well outflow, and any other values of parameters associated with the well system. In some embodiments, the controller will represent a graphical representation of one or more of the well inflow, slippage, and cavity fillage in an human-machine interface (HMI) as well as any other variables that are stored. The controller will track pump slippage and will cause an alarm if high pump slippage is detected to identify a potential condition of excessive pump wear.

The controller 110 used for monitoring and controlling operation of the pump 130 may include a computerized control system. Various aspects may be implemented as specialized software executing in a general-purpose computer system 600 such as that shown in FIG. 6. The computer system 600 may include a processor 602 connected to one or more memory devices 604, such as a disk drive, solid state memory, or other device for storing data. Memory 604 is typically used for storing programs and data during operation of the computer system 600. Components of computer system 600 may be coupled by an interconnection mechanism 606, which may include one or more busses (e.g., between components that are integrated within a same machine) and/or a network (e.g., between components that reside on separate discrete machines). The interconnection mechanism 606 enables communications (e.g., data, instructions) to be exchanged between system components of system 600. Computer system 600 also includes one or more input devices 608, for example, a keyboard, mouse, trackball, microphone, touch screen, and one or more output devices 610, for example, a printing device, display screen, and/or speaker. The output devices 610 may also comprise valves, pumps, or switches which may be utilized to control the pump 130 and/or variable speed drive 120. One or more sensors 614 may also provide input to the computer system 200. These sensors may include, for example, a pump speed sensor, flow sensor 150, well head pressure sensors, line pressure sensors, and/or line temperature sensors. In addition, computer system 600 may contain one or more interfaces (not shown) that connect computer system 600 to a communication network in addition or as an alternative to the interconnection mechanism 606.

Figure 7:
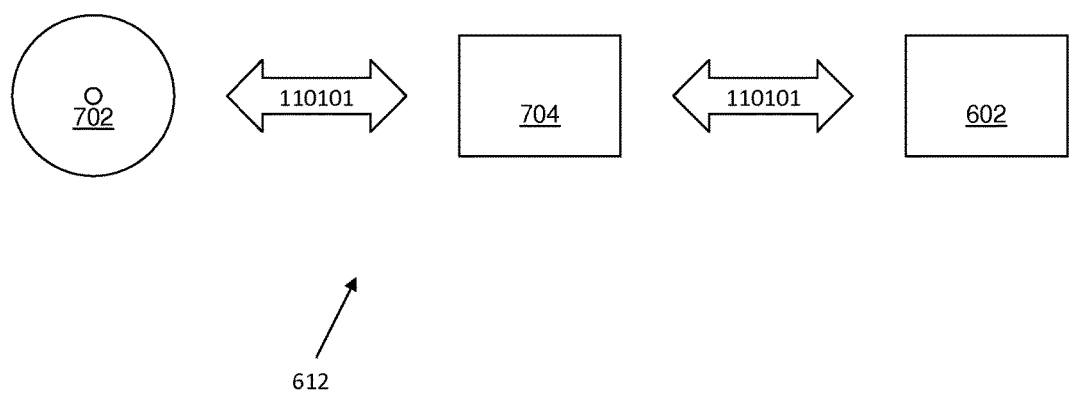
FIG. 7 is a block diagram of a memory system of the computer system of FIG. 6.

The storage system 612, shown in greater detail in FIG. 7, typically includes a computer readable and writeable nonvolatile recording medium 702 in which signals are stored that define a program to be executed by the processor or information to be processed by the program. The medium may include, for example, a disk or flash memory. Typically, in operation, the processor causes data to be read from the nonvolatile recording medium 702 into another memory 704 that allows for faster access to the information by the processor than does the medium 702. This memory 704 is typically a volatile, random access memory such as a dynamic random access memory (DRAM) or static memory (SRAM). It may be located in storage system 612, as shown, or in memory system 604. The processor 602 generally manipulates the data within the integrated circuit memory 604, 704 and then copies the data to the medium 702 after processing is completed. A variety of mechanisms are known for managing data movement between the medium 702 and the integrated circuit memory element 604, 704, and embodiments disclosed herein are not limited to any particular data movement mechanism. Embodiments disclosed herein are not limited to a particular memory system 604 or storage system 612.

The computer system may include specially-programmed, special-purpose hardware, for example, an application-specific integrated circuit (ASIC). Embodiments disclosed herein may be implemented in software, hardware or firmware, or any combination thereof. Further, such methods, acts, systems, system elements and components thereof may be implemented as part of the computer system described above or as an independent component.

Figure 6:
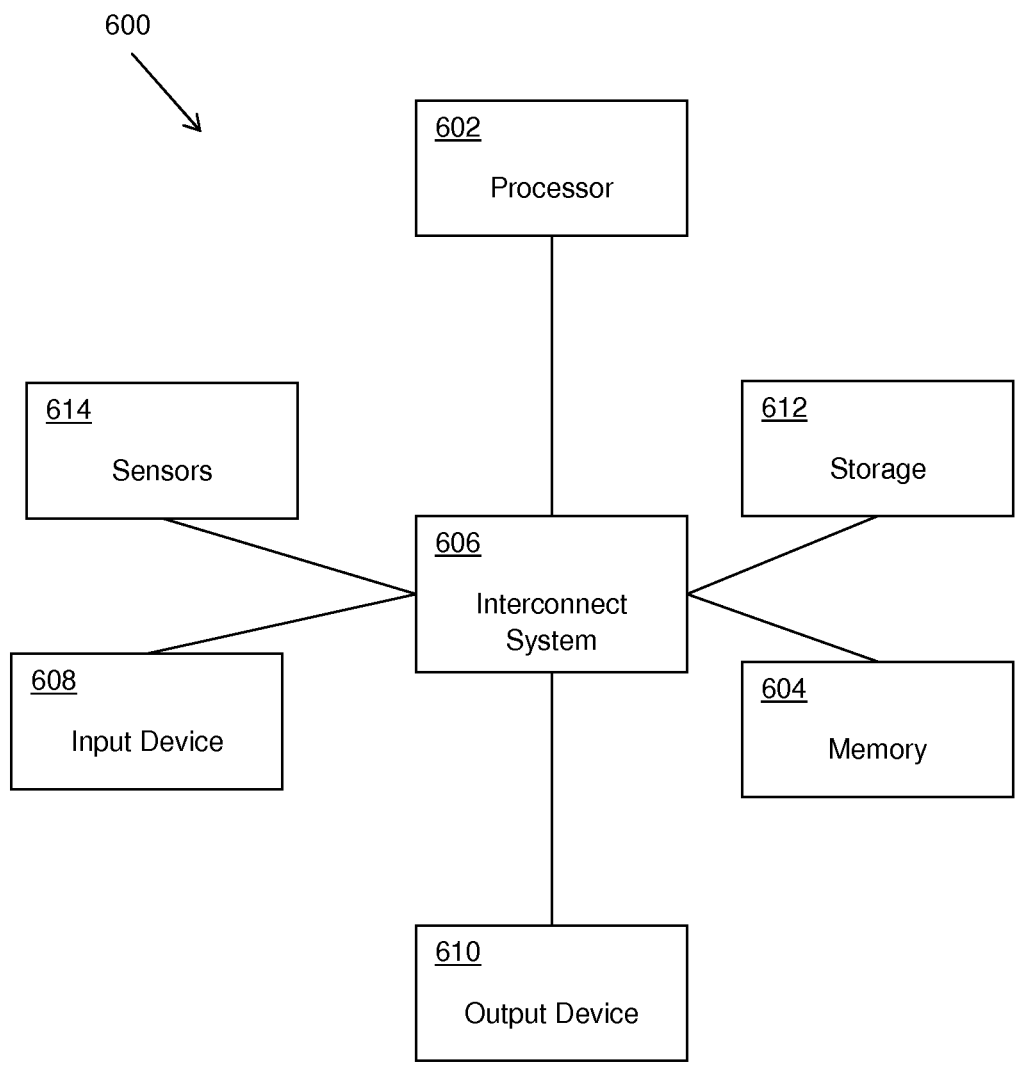
FIG. 6 is a block diagram of a computer system upon which embodiments of a method for controlling a pump of a well may be performed.

Although computer system 600 is shown by way of example as one type of computer system upon which various embodiments disclosed herein may be practiced, it should be appreciated that the embodiments disclosed herein are not limited to being implemented on the computer system as shown in FIG. 6. Various embodiments disclosed herein may be practiced on one or more computers having a different architecture or components that that shown in FIG. 6.

Computer system 600 may be a general-purpose computer system that is programmable using a high-level computer programming language. Computer system 600 may be also implemented using specially programmed, special purpose hardware. In computer system 600, processor 602 is typically a commercially available processor such as the well-known Pentium™ or Core™ class processors available from the Intel Corporation. Many other processors are available. Such a processor usually executes an operating system which may be, for example, the Windows 7 or Windows 8 operating system available from the Microsoft Corporation, the MAC OS System X available from Apple Computer, the Solaris Operating System available from Sun Microsystems, or UNIX available from various sources. Many other operating systems may be used.

The processor and operating system together define a computer platform for which application programs in high-level programming languages are written. It should be understood that embodiments disclosed herein are not limited to a particular computer system platform, processor, operating system, or network. Also, it should be apparent to those skilled in the art that the embodiments disclosed herein are not limited to a specific programming language or computer system. Further, it should be appreciated that other appropriate programming languages and other appropriate computer systems could also be used.

One or more portions of the computer system may be distributed across one or more computer systems (not shown) coupled to a communications network. These computer systems also may be general-purpose computer systems. For example, various embodiments disclosed herein may be distributed among one or more computer systems configured to provide a service (e.g., servers) to one or more client computers, or to perform an overall task as part of a distributed system. For example, various embodiments disclosed herein may be performed on a client-server system that includes components distributed among one or more server systems that perform various functions according to various embodiments. These components may be executable, intermediate (e.g., IL) or interpreted (e.g., Java) code which communicate over a communication network (e.g., the Internet) using a communication protocol (e.g., TCP/IP). In some embodiments one or more components of the computer system 600 may communicate with one or more other components over a wireless network, including, for example, a cellular telephone network.

It should be appreciated that embodiments disclosed herein are not limited to executing on any particular system or group of systems. Also, it should be appreciated that embodiments disclosed herein are not limited to any particular distributed architecture, network, or communication protocol. Various embodiments may be programmed using an object-oriented programming language, such as SmallTalk, Java, C++, Ada, or C# (C-Sharp). Other object-oriented programming languages may also be used. Alternatively, functional, scripting, and/or logical programming languages may be used. Various embodiments disclosed herein may be implemented in a non-programmed environment (e.g., documents created in HTML, XML or other format that, when viewed in a window of a browser program, render aspects of a graphical-user interface (GUI) or perform other functions). Various embodiments disclosed herein may be implemented as programmed or non-programmed elements, or any combination thereof.

In some embodiments, the controller 110 may be implemented as a programmable logic controller (PLC) and include capabilities for data sharing with a supervisory system, for example, a SCADA (supervisory control and data acquisition) system. A HMI may be the primary interface with the controller 110.

Having thus described several aspects of at least one embodiment of this invention, it is to be appreciated various alterations, modifications, and improvements will readily occur to those skilled in the art. Any feature described in any embodiment may be included in or substituted for any feature of any other embodiment. Such alterations, modifications, and improvements are intended to be part of this disclosure, and are intended to be within the scope of the invention. Accordingly, the foregoing description and drawings are by way of example only.

What is claimed is:

1. A method for controlling the production efficiency of a well, the method comprising:
    determining one or more parameters of a pump model for a pump of the well, the one or more parameters of the pump model including cavity fillage, the cavity fillage being determined by a method including:
        measuring a first well outflow rate while running the pump at a first speed;
        measuring a second well outflow rate while running the pump at a second speed; and
        calculating the cavity fillage from a comparison between the first well outflow rate and the second well outflow rate, a comparison between the first speed and the second speed, and a displacement of the pump;
    determining a well inflow rate of liquid into the well; and
    adjusting a pumping speed of the pump based on the one or more parameters of the pump model to maintain a well outflow rate of liquid from the well at a predetermined fraction of the well inflow rate.

2. The method of claim 1, further comprising calculating the slippage from the first well outflow rate, the first speed, the cavity fillage, and the displacement of the pump.

3. The method of claim 2, wherein the well inflow rate is re-evaluated on a periodic basis, the well inflow rate determined using a method including:
    pumping a level of liquid in the well down to an intake level of the pump;
    measuring a well outflow rate of the liquid from the well while operating the pump with the level of liquid in the well at the intake level of the pump; and
    setting the re-evaluated well inflow rate at the measured well outflow rate.

4. The method of claim 3, further comprising increasing the efficiency of the well by adjusting the pumping speed of the pump based on the re-evaluated well inflow rate, the slippage, and the displacement of the pump.

5. The method of claim 1, further comprising continuously monitoring the pumping speed of the pump and the well outflow rate and, responsive to the well outflow rate being less than a predetermined amount less than an expected well outflow rate, adjusting the pumping speed.

6. A method for controlling the production efficiency of a well, the method comprising:
    determining one or more parameters of a pump model for a pump of the well, the one or more parameters of the pump model including one of slippage and cavity fillage;
    determining a well inflow rate of liquid into the well;
    adjusting a pumping speed of the pump based on the one or more parameters of the pump model to maintain a well outflow rate of liquid from the well at a predetermined fraction of the well inflow rate; and
    continuously monitoring the pumping speed of the pump and the well outflow rate and, responsive to the well outflow rate being more than a predetermined amount more than an expected well outflow rate, performing a re-calculation of slippage of the pump.

7. The method of claim 6, further comprising adjusting the pump speed based on the re-calculation of the slippage of the pump responsive to the well outflow rate being more than the predetermined amount more than the expected well outflow rate.

8. A system for pumping liquid from a well, the system comprising:
    a liquid pump disposed in a bore of the well;
    a flow meter configured to measure a well outflow rate of liquid from the well; and
    a controller in communication with the liquid pump and the flow meter and configured to:
        determine one or more parameters of a pump model for the liquid pump, the one or more parameters of the pump model including cavity fillage, the controller configured to determine the cavity fillage by a method including:
            receiving an indication of a first well outflow from the flow meter while running the liquid pump at a first speed;
            receiving an indication of a second well outflow rate from the flow meter while running the liquid pump at a second speed; and
            calculating the cavity fillage from a comparison between the first well outflow rate and the second well outflow rate, a comparison between the first speed and the second speed, and a displacement of the fluid pump;
        determine a well inflow rate of liquid into the bore of the well; and
        adjust a pumping speed of the liquid pump based on the one or more parameters of the pump model to maintain the well outflow rate at a predetermined fraction of the well inflow rate.

9. The system of claim 8, wherein the controller is further configured to calculate the slippage from the first well outflow rate, the first speed, the cavity fillage, and the displacement of the pump.

10. The system of claim 9, wherein the controller is further configured re-evaluate the well inflow rate on a periodic basis, the well inflow rate determined by the controller using a method including:
    pumping a level of fluid in the well down to an intake level of the liquid pump;
    receiving an indication of a well outflow rate of the fluid from the well from the flow meter while operating the liquid pump with the level of fluid in the well at the intake level of the liquid pump; and
    setting the re-evaluated well inflow rate at the well outflow rate.

11. The system of claim 8, wherein the controller is further configured to continuously monitor the pumping speed of the liquid pump and the well outflow rate and, responsive to the well outflow rate being less than a predetermined amount less than an expected well outflow rate, adjust the pumping speed.

12. The system of claim 8, wherein the controller is further configured to store information pertaining to the well inflow rate, slippage, cavity fillage, well outflow rate, and other values of parameters associated with the well system.

13. The system of claim 12, wherein the controller is further configured to represent a graphical representation of the information in a human-machine interface.

14. The system of claim 8, wherein the controller is further configured to track pump slippage and cause an alarm if high pump slippage is detected.

15. A system for pumping liquid from a well, the system comprising:
   a liquid pump disposed in a bore of the well;
   a flow meter configured to measure a well outflow rate of liquid from the well; and
   a controller in communication with the liquid pump and the flow meter and configured to:
      determine one or more parameters of a pump model for the liquid pump, the one or more parameters of the pump model including one of slippage and cavity fillage;
      determine a well inflow rate of liquid into the bore of the well;
      adjust a pumping speed of the liquid pump based on the one or more parameters of the pump model to maintain the well outflow rate at a predetermined fraction of the well inflow rate; and
      continuously monitor the pumping speed of the pump and the well outflow rate and, responsive to the well outflow rate being more than a predetermined amount more than an expected well outflow rate, perform a re-calculation of slippage of the liquid pump.

16. The system of claim 15, wherein the controller is further configured to adjust the pumping speed based on the re-calculation of the slippage of the liquid pump responsive to the well outflow rate being more than the predetermined amount more than the expected well outflow rate.

17. A non-transitory computer readable medium having computer executable instructions encoded thereon which, when executed on a controller of a system for pumping liquid from a well cause the controller to perform a method including:
   determining one or more parameters of a pump model for a pump of the well, the one or more parameters including a cavity fillage of the pump, the cavity fillage of the pump determined by a method including:
      measuring a first well inflow rate while running the pump at a first speed;
      measuring a second well inflow rate while running the pump at a second speed; and
      calculating the cavity fillage from a comparison between the first well inflow rate and the second well inflow rate, a comparison between the first speed and the second speed, and a displacement of the pump;
   determining a well inflow rate of liquid into the well; and
   adjusting a pumping speed of the pump based on the one or more parameters of the pump model to maintain a well outflow rate of liquid from the well at a predetermined fraction of the well inflow rate.

18. The computer readable medium of claim 17, wherein the instructions further cause the controller to periodically re-evaluate the well inflow rate using a method including:
   pumping a level of fluid in the well down to an intake level of the pump;
   measuring a well outflow rate of the fluid from the well while operating the pump with the level of fluid in the well at the intake level of the pump; and
   setting the re-evaluated well inflow rate at the measured well outflow rate.

* * * * *